US008416450B2

(12) United States Patent
Delfer et al.

(10) Patent No.: US 8,416,450 B2
(45) **Date of Patent: *Apr. 9, 2013**

(54) TURN-BAR DOCUMENT HANDLING APPARATUS FOR UTILIZATION WITH A LAZY-PORTRAIT DOCUMENT PRINTING SYSTEM

(75) Inventors: Frank W. Delfer, Granite Bay, CA (US); Charles B. Clupper, El Dorado Hills, CA (US); Marc J. Fagan, Folsom, CA (US); Brett Jay Flickner, Folsom, CA (US); Matthew Thomas Leettola, El Dorado Hills, CA (US)

(73) Assignee: DST Output, El Dorado Hills, CA (US)

( * ) Notice: Subject to any disclaimer, the term of this patent is extended or adjusted under 35 U.S.C. 154(b) by 542 days.

This patent is subject to a terminal disclaimer.

(21) Appl. No.: 12/037,654

(22) Filed: Feb. 26, 2008

(65) Prior Publication Data

US 2008/0217835 A1 Sep. 11, 2008

Related U.S. Application Data

(63) Continuation-in-part of application No. 11/708,782, filed on Feb. 21, 2007, which is a continuation-in-part of application No. 11/492,594, filed on Jul. 25, 2006.

(60) Provisional application No. 60/904,227, filed on Feb. 28, 2007.

(51) Int. Cl.

| | |
|---|---|
| ***G06K 15/22*** | (2006.01) |
| ***G06K 15/00*** | (2006.01) |
| ***B41C 1/00*** | (2006.01) |
| ***H04N 1/40*** | (2006.01) |
| ***H04N 1/387*** | (2006.01) |
| ***B65H 23/04*** | (2006.01) |

(52) U.S. Cl. ........ 358/1.3; 358/1.4; 358/1.18; 358/3.32; 358/3.31; 358/450; 242/615

(58) Field of Classification Search ................. 358/1.18, 358/1.15, 1.3, 1.4, 3.32, 3.31; 281/21.1; 270/8, 41, 20.1, 58.06
See application file for complete search history.

(56) References Cited

U.S. PATENT DOCUMENTS

| | | | | |
|---|---|---|---|---|
| 2,092,977 A * | 9/1937 | Kaster | ............................... | 270/8 |
| 2,230,655 A * | 2/1941 | Sauerwein | ................... | 270/20.1 |
| 3,255,679 A * | 6/1966 | Eckels | .......................... | 493/333 |

(Continued)

FOREIGN PATENT DOCUMENTS

| | | |
|---|---|---|
| EP | 1174327 A3 | 1/2002 |
| EP | 1524169 A1 | 4/2005 |

(Continued)

*Primary Examiner* — Akwasi M Sarpong
(74) *Attorney, Agent, or Firm* — James M. Ritchey

(57) ABSTRACT

For use with lazy-portrait narrow-end to narrow-end (LPEE) formatted document pages printed on a continuous web of material, a system and method for assembling correctly page-sequenced document sets that utilizes a slitter for separating the LPEE formatted document pages into two separate streams of continuous sheets, a turn-bar assembly positioned to flip only one of the continuous sheet streams, a cutter that produces separates pages from both the flipped stream of sheets and non-flipped stream of sheets, a collator for collating all of the separate pages into the correctly page-sequenced document sets, and a controller for tracking the LPEE formatted document pages and overseeing the assembly of the correctly page-sequenced document sets.

12 Claims, 5 Drawing Sheets

U.S. PATENT DOCUMENTS

| | | | | |
|---|---|---|---|---|
| 3,894,909 | A * | 7/1975 | Rod | 156/568 |
| 4,189,134 | A * | 2/1980 | Mills et al. | 53/429 |
| 5,409,317 | A * | 4/1995 | Ueno et al. | 400/61 |
| 5,754,434 | A * | 5/1998 | Delfer et al. | 700/223 |
| 5,825,996 | A | 10/1998 | Davis et al. | |
| 5,887,126 | A | 3/1999 | Fujimoto | |
| 5,995,721 | A | 11/1999 | Rourke et al. | |
| 6,050,191 | A | 4/2000 | Enderle et al. | |
| 6,092,761 | A | 7/2000 | Mushaben | |
| 6,222,635 | B1 | 4/2001 | Gotoh | |
| 6,313,822 | B1 | 11/2001 | McKay | |
| 6,397,745 | B2 * | 6/2002 | Koehler | 101/366 |
| 6,417,931 | B2 | 7/2002 | Mori et al. | |
| 6,507,411 | B1 | 1/2003 | Nishikawa et al. | |
| 6,509,977 | B1 | 1/2003 | Kujirai et al. | |
| 6,559,971 | B1 | 5/2003 | Watts et al. | |
| 6,595,465 | B2 * | 7/2003 | Lamothe | 242/615.21 |
| 6,736,350 | B2 * | 5/2004 | Lamothe | 242/615.21 |
| 6,810,813 | B2 * | 11/2004 | Chretinat et al. | 101/485 |
| 6,813,038 | B1 | 11/2004 | Kadowaki | |
| 6,994,005 | B2 | 2/2006 | Lamothe | |
| 7,095,526 | B1 * | 8/2006 | Housel | 358/1.18 |
| 2006/0126120 | A1 * | 6/2006 | Imafuku et al. | 358/1.18 |

FOREIGN PATENT DOCUMENTS

| | | | |
|---|---|---|---|
| JP | 08-179576 | A | 7/1996 |
| JP | 2000-141793 | A | 5/2000 |
| JP | 2000-229751 | A | 8/2000 |
| JP | 2003-011452 | A | 1/2003 |
| JP | 2005-297952 | A | 10/2005 |
| JP | 2005-320104 | A | 11/2005 |
| JP | 2006-273158 | A | 10/2006 |

* cited by examiner

TURN-BAR DOCUMENT HANDLING APPARATUS FOR UTILIZATION WITH A LAZY-PORTRAIT DOCUMENT PRINTING SYSTEM

CROSS-REFERENCE TO RELATED APPLICATIONS

This application is a continuation-in-part of copending application Ser. No. 11/708,782 filed on Feb. 21, 2007, incorporated herein by reference in its entirety, which is a continuation-in-part of copending application Ser. No. 11/492,594 filed on Jul. 25, 2006, incorporated herein by reference in its entirety. This application claims priority from U.S. provisional application Ser. No. 60/904,227 filed on Feb. 28, 2007, incorporated herein by reference in its entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to a system and method for converting a stream of document pages printed in "lazy-portrait" formatting (printing across the continuous paper web to produce paired portrait orientated pages) into acceptably oriented pages that are then processed and grouped into pre-designated document sets with continuously numbered pages. More particularly to a system and method for properly orienting and page-sequencing documents that are printed on a continuous web of paper, wherein the printing format for the continuous web generates "lazy-portrait" formatted pages (printing across the paper web to produce paired portrait orientated pages) in which, when head-to-head or bottom-to-bottom paired pages are printed, one half of the printed pairs must be flipped for generation of a sequential page count in each final assembled document set.

2. Description of Related Art

To fully understand the subject invention, it is deemed worthwhile to stress the difference between existing/traditional "two-up portrait" versus the current and novel subject "lazy-portrait" printing styles and the documents produced by each type of printing scheme. Existing high-speed duplex variable data printing is carried out most frequently with continuous form printers using what is termed a "two-up portrait" format on a continuous web of paper. Two portrait printed sheets are printed side-by-side (both oriented in the same exact direction. This process, the standard in the industry, produces a continuous output of pages where, for example, the first four sheets (eight pages, front and back on four, eventually separate, sheets) appear as shown in FIG. 1. Currently, an advantage of printing in the prior art format is that it is compatible with more existing printers and more existing post-printing equipment for handling the printed sheets. A critical element of the prior art printing method is that to print either black or color markings on both pages, with the headings in color and the body in black, both the black and color-capable printing heads must span the entire width (long-side to long-side of a page) of both the duplexed sheets, $W^B$ and $W^C$, respectively (see FIG. 1). FIG. 2 depicts a pair of traditionally formatted pages that are then separated/cut-apart and simply stacked on top of one another, as shown in FIG. 3, to produce a correctly page-sequences document set. Examples of printers that function in this manner are the IBM InfoPrint 4000 and Oce VarioStream 7000. A typical traditional printing system is seen in FIG. 4. where a continuous stream of traditionally printed sheets (such as the ones shown in FIG. 1 and/or FIG. 2) comes in from the far left and moves into a slitter that separates the single steam into two streams of continuous sheets that then enter a cutter and collator for further processing to generate correctly page-sequenced document sets (as illustrated in FIG. 3 for two cut sheets).

For the current subject invention, paper is printed in a lazy-portrait narrow-end to narrow-end (LPEE) format, which is a means for more efficient and cost effective printing of variable and form data onto paper oriented in a lazy-portrait orientation. The term "lazy-portrait" (also known in the industry as "rotated landscape" when a printer merely uses a traditional printer head alignment spanning the entire page to print a rotated image) is defined as a portrait oriented page that is generated by printing the page from one wide edge to the other wide edge (side to side) and not from narrow edge or end to narrow edge or end (top to bottom or visa-versa), as is done in every other currently existing printing system.

The critical issue with the subject invention is that when a pair of head-to-head or bottom-to-bottom pages are printed on a continuous stream of paper, the single stream of paper with the paired images must then be separated/slitted into two separate streams of paper with one stream being flipped over to correctly orient the final pages when cut and stacked into a document set. The current subject invention presents a system and method for accomplishing this sheet flipping process by flipping one entire stream of post-slitted sheets.

Again, it is noted that conventional paper transport cart systems and paper handling systems exist that can transport and process paper printed in the existing and traditional two-up portrait style (not the subject paper LPEE orientation). Future document sets have pages that are already aligned head to head, and existing finishing, cutting, and inserting equipment readily handles the orientation of the two-up portrait printed paper by slitting the two-up portrait web of paper in either first to last (1 to N) or last to first (N to 1) document page-sequencing.

Since the two-up portrait printed paper is printed narrow-end to narrow-end, there is a need to rotate/flip the stack of finished paper pages so that the document heads from both stacks (the slit stacks) of documents need to be ultimately presented and accumulated together to form a finished document set.

Various turn-bars are found on cutters for folded continuous form stacks or continuous form rolls, but the entire stream of paper is always reoriented by use of such turn-bars, completely unlike in the subject system/method in which only one half of the initial paper stream is flipped. Prior inserters handle stacks of paper that are in printed two-up portrait format with either the head of the document or the bottom of the document printed first, in either first to last sequence order, or last to first sequence order.

U.S. Pat. No. 6,994,005 (an apparatus for slitting, merging, and cutting a continuous paper web) describes an in-line turn-bar that is positioned after slitting and prior to merging the two streams, but this invention only positionally moves one slit lane of paper to overlap with another slit lane of paper, without turning over the obverse to reverse orientation (or face to back orientation). This patent differs from the subject invention in that, since there is no need, suggestion, or teaching to so, it does not turn over the paper orientation.

U.S. Pat. No. 6,595,465 (a turn-bar assembly for redirecting a continuous paper web) describes turning a single web of paper to reorient the travel direction and, in addition, to optionally flip the paper web from obverse to reverse (face up to face down) image orientation in this reoriented travel direction. This patent differs from the subject invention in that it reorients the paper direction, which is not associated with the manner in which a turn-bar is employed in the subject invention.

BRIEF SUMMARY OF THE INVENTION

An object of the present invention is to provide a paper handling system that orients lazy-portrait narrow-end to narrow-end format printed sheets into correctly page-sequenced document sets.

Another object of the present invention is to furnish a paper handling system that flips one of two paired lazy-portrait narrow-end to narrow-end format printed sheets to generate printed sheets that have correctly sequenced pages that are assembled into desired document sets.

A further object of the present invention is to supply a paper handling system that produced correctly page-sequenced document sets from a continuous web of lazy-portrait narrow-end to narrow-end (LPEE) format printed sheets by slitting a continuous stream of LPEE paired sheets into two streams, flipping one of the two streams, cutting each stream, and collating the cut sheets into correctly page-sequenced document sets.

Still another object of the present invention is to disclose a method that orients lazy-portrait narrow-end to narrow-end format printed sheets into correctly page-sequenced document sets.

Yet a further object of the present invention is to describe a method that flips one of two paired lazy-portrait narrow-end to narrow-end format printed sheets to generate printed sheets that have correctly sequenced pages that are assembled into desired document sets.

Still yet another object of the present invention is to relate a method that produced correctly page-sequenced document sets from a continuous web of lazy-portrait narrow-end to narrow-end (LPEE) format printed sheets by slitting a continuous stream of LPEE paired sheets into two streams, flipping one of the two streams, cutting each stream, and collating the cut sheets into correctly page-sequenced document sets.

Disclosed is a system and method for correctly page-sequencing individual sheets initially printed on a continuous web of paper in a lazy-portrait narrow-end to narrow-end (LPEE) format, which is a means for more efficient and cost effective printing of variable and form data onto paper oriented in a lazy-portrait orientation. The term "lazy-portrait" is defined as a portrait oriented page that is generated by printing the page from one wide edge to the other wide edge (side to side) as it passes through a printer and not from narrow edge or end to narrow edge or end (top to bottom or visa-versa), as is done in every other currently existing printing system.

When a pair of head-to-head or bottom-to-bottom pages are printed on a continuous stream of paper, the single stream of paper with the paired images must then be separated/slitted into two separate streams of paper with one stream being flipped over to correctly orient the final pages (to produce the correct page-sequences) when cut and stacked into a document set. The current subject invention presents a system and method for accomplishing this sheet flipping process. The printed continuous web is split into two continuous streams of sheets. One of the two continuous streams of sheets is then flipped by a turn-bar assembly, each of the two streams are then cut into separate sheets, and collated into desired document sets with correctly page-sequenced sheets.

Further objects and aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWINGS

The invention will be more fully understood by reference to the following drawings which are for illustrative purposes only.

DETAILED DESCRIPTION OF THE INVENTION

Referring more specifically to the drawings, for illustrative purposes the present invention is embodied in the apparatus generally shown in FIG. 1 through FIG. 9. It will be appreciated that the system, method, and apparatus may vary as to configuration and as to details of the parts, and that the method may vary as to the specific steps and sequence, without departing from the basic concepts as disclosed herein.

Figure 1:
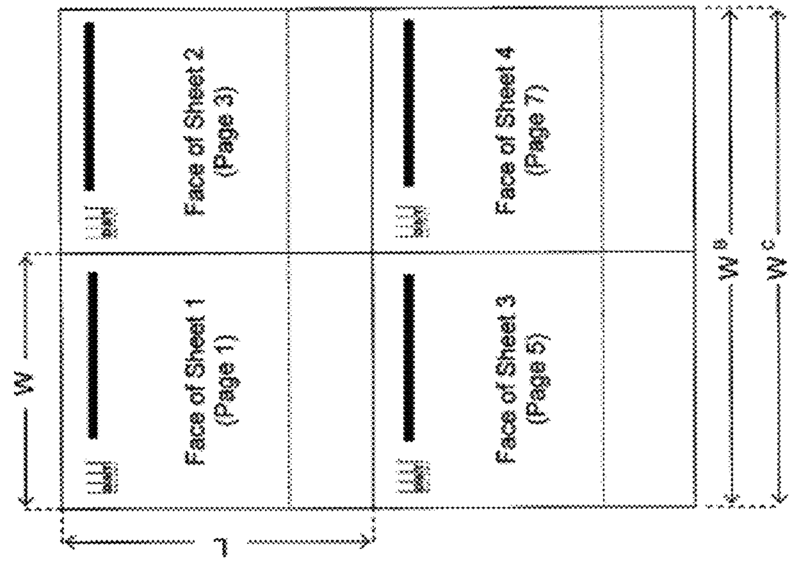
FIG. 1 (Prior Art)
FIG. 1 is a depiction representing the PRIOR ART, wherein four total sheets are shown with paired/duplexed-document pages printed side-by-side, with all side-by-side pages oriented in traditional portrait-parallel fashion to one another.
Figure 2:
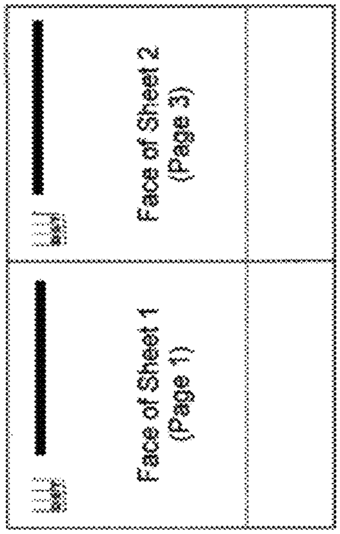
FIG. 2 (Prior Art)
FIG. 2 is a depiction representing the PRIOR ART, wherein two total sheets (still physically connected together) are shown with paired/duplexed-document pages printed side-by-side, with all side-by-side pages oriented in traditional portrait-parallel fashion to one another.
Figure 3:
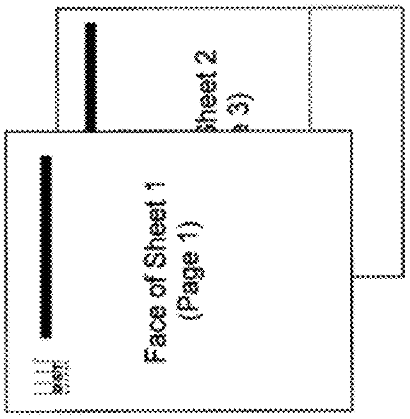
FIG. 3 (Prior Art)
FIG. 3 is a depiction representing the PRIOR ART, wherein two total sheets are shown (printed as traditional side-by-side paired/duplexed-document pages, with all side-by-side pages oriented in the traditional portrait-parallel fashion to one another) separated and directly stacked on top of one another to generate a correctly page-sequenced document.
Figure 4:
FIG. 4 (Prior Art)
FIG. 4 is a picture of a PRIOR ART printing, slitting, cutting, and collating system that merely processes traditional side-by-side portrait-parallel printed pages into documents sets.

Once again, to fully understand the subject invention, it is deemed worthwhile to review the difference between existing/traditional "two-up portrait" versus the current and novel subject "lazy-portrait" printing styles and the documents produced by each type of printing scheme. Existing high-speed duplex variable data printing is carried out most frequently with continuous form printers using what is termed a "two-up portrait" format on a continuous web of paper. Two portrait printed sheets are printed side-by-side (both oriented in the same exact direction. This process, the standard in the industry, produces a continuous output of pages where, for example, the first four sheets (eight pages, front and back on four, eventually separate, sheets) appear as shown in FIG. 1. Currently, an advantage of printing in the prior art format is that it is compatible with more existing printers and more existing post-printing equipment for handling the printed sheets. A critical element of the prior art printing method is that to print either black or color markings on both pages, with the headings in color and the body in black, both the black and color-capable printing heads must span the entire width (long-side to long-side of a page) of both the duplexed sheets, $W^B$ and $W^C$, respectively (see FIG. 1). FIG. 2 depicts a pair of traditionally formatted pages that are then separated/cut-apart and simply stacked on top of one another, as shown in FIG. 3, to produce a correctly page-sequences document set. Examples of printers that function in this manner are the IBM InfoPrint 4000 and Oce VarioStream 7000. A typical traditional printing system is seen in FIG. 4. FIG. 4 depicts a continuous stream of traditionally printed sheets (such as the ones shown in FIG. 1 and/or FIG. 2) coming in from the far left and moving into a slitter that separated the single steam into two streams of continuous sheets that then enter a cutter and collator for further processing to generate correctly page-sequenced document sets (a illustrated in FIG. 3).

Figure 5:
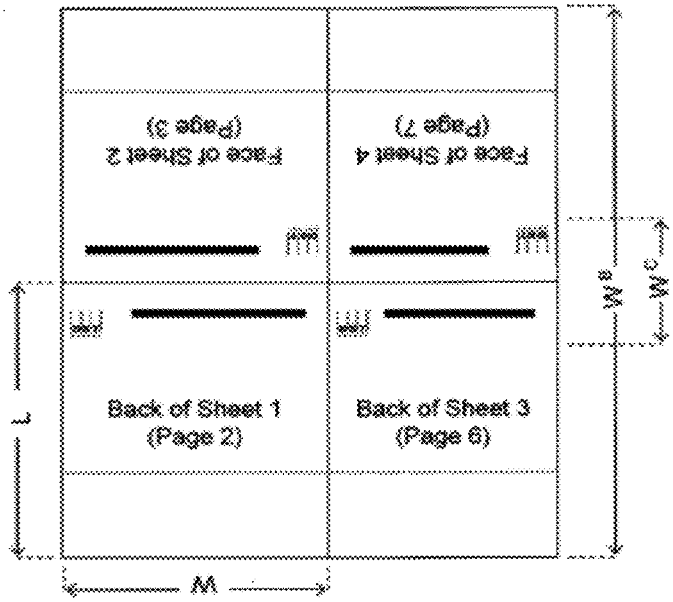
FIG. 5 illustrates the subject invention's formatting technique that produces lazy-portrait documents wherein four total printed sheets are depicted in a duplexed lazy-portrait head-to-head page orientation and printed on a continuous web in two printing lanes (simplexed printing jobs are only printed on one side of a sheet, thereby making assembly of a multi-page document more simplistic than with the duplexed embodiment which requires a sheet flipping process step for one of paired sheets relative to the other sheet that is the main focus of the subject invention).

For the current subject invention, paper is printed in a lazy-portrait narrow-end to narrow-end (LPEE) format, which is a means for more efficient and cost effective printing of variable and form data onto paper oriented in a lazy-portrait orientation (see FIG. 5). The term "lazy-portrait" (also known in the industry as "rotated landscape" when a printer merely uses a traditional printer head alignment spanning the entire page to print a single rotated image narrow edge to narrow edge) is defined as a portrait oriented page that is generated by printing the page from one wide edge to the other wide edge (side to side) and not from narrow edge or end to narrow edge or end (top to bottom or visa-versa), as is done in every other currently existing printing system.

Figure 8:
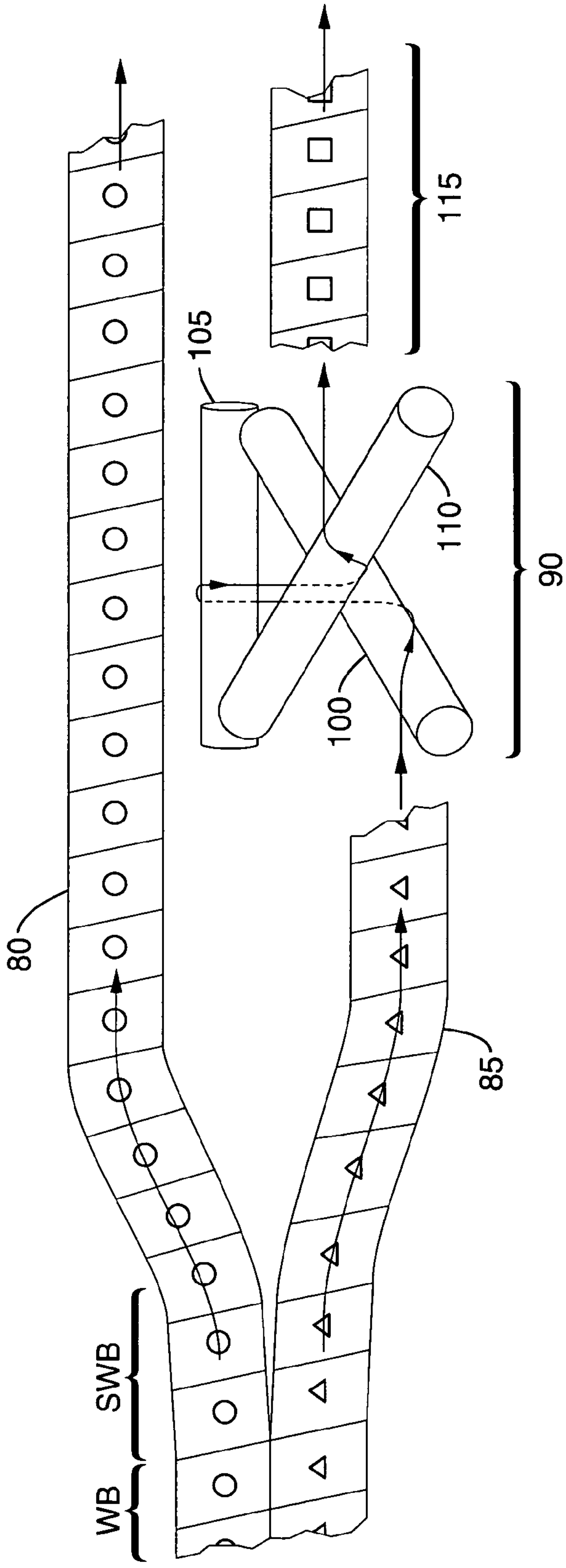
FIG. 8 shows a turn-bar assembly used to flip only one stream of the two streams of paper generated by a slitter and positioned between the slitter and a cutter.
Figure 9:
FIG. 9 is a picture showing the physical location of the turn-bar assembly (superimposed on one stream of sheets for flipping that stream of the two slitter-generated streams) between an exemplary slitter and exemplary cutter.

The critically issue with the subject invention is that when a pair of head-to-head or bottom-to-bottom pages (see FIG. 5 for four sheets and/or FIG. 6 for two sheets) are printed on a continuous stream of paper, the single stream of paper with the paired images must then be separated/slitted into two separate streams of paper with one stream being flipped over (as seen in FIG. 8 with the circle-marked pages on one stream remaining up while the triangle-marked pages of the other stream flip over to the opposite sides that are marked with squares) to correctly orient (correct page-sequence) the final pages when cut and stacked into a document set. The current subject invention presents a system and method for accomplishing this sheet flipping process by flipping one entire stream of post-slitter sheets.

Figure 6:
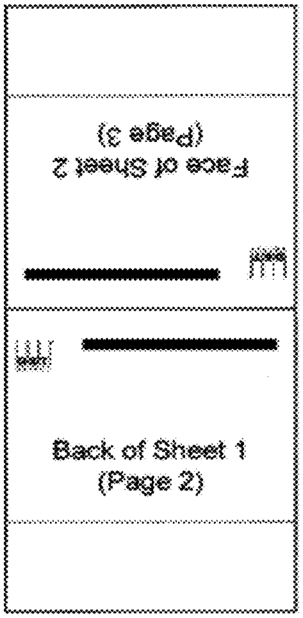
FIG. 6 shows the subject invention's formatting technique that produces lazy-portrait documents wherein a pair of printed sheets is depicted in a duplexed lazy-portrait head-to-head page orientation and printed on a continuous web in two printing lanes.
Figure 7:
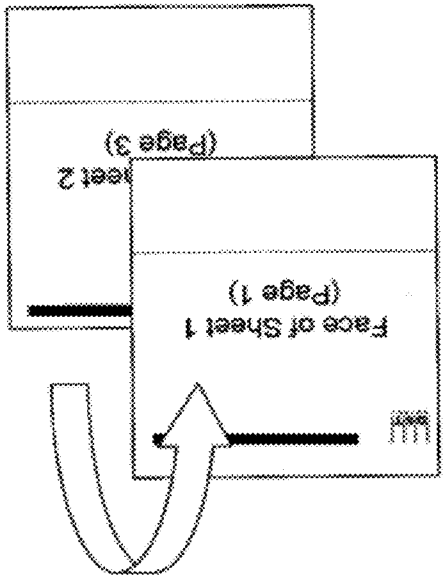
FIG. 7 shows the subject invention's ability to flip one of the paired sheets seen in FIG. 6 to produce correctly page-sequenced sheets (during normal operation, an entire stream of sheets are flipped and matched with its appropriate mate from the original pairing).

The subject system/method provides a novel method for handling the lazy-portrait narrow-end to narrow-end printed sheets that are, initially, connected to each other as shown in FIG. 6. Note how in FIG. 6, on the left side of the web, the side of the sheet presented to the viewer is the BACK of sheet 1, whereas on the right side of the web, the side of the sheet presented is the FACE of sheet 2. To assemble this two-sheet statement/document, these two sheets must come together like butterfly wings, i.e. one side has to be flipped over onto the other, as clearly shown in FIG. 7.

This additional element of processing complexity significantly impacts the statement assembly process. For example, a Stralfors Lasermax 162CD Cutter utilized in conventional print jobs would be completely incapable of processing the subject invention work properly, because it is incapable of carrying out the butterfly maneuver. On the other hand, the Tecnau TC2000 Cutter mentioned above would need only to: 1) have one of the sub-webs turned over after slitting, and 2) be able to cut the length, L, of the statement/document, rather than just the width, W, of the statement/document. The second requirement is easily met for all ordinary sizes of forms, certainly all those for which the length is 12 inches or less. The first requirement can be met by employing a device known as a turn-bar. As seen in FIG. 8, a suitable turn-bar assembly 90 is a series of rollers 100, 105, and 110. In FIG. 8, the LPEE formatted web WB enters from the left, is slit by a slitter in region SWB into two streams of sheets 80 (marked with circles on the showing faces) and 85 (marked with triangles of the showing faces), and then one stream 85 is flipped or inverted 115 (marked with squares on the reverse faces from the triangle-marked faces) on the fly during processing by the turn-bar assembly 90. Turn-bars are often utilized in printing processes, but for different reasons than apply for the subject invention. The turn-bar assembly 90 resides between the slitter and cutter/collator to accept one stream of sheets 85. The turn-bar assembly 90 (comprising individual turn-bars 100, 105, 110, seen in FIG. 8) effects the following series of state changes to one stream of sheets 85: 1) turn-bar 100 performs a 90° turn with a flip; 2) turn-bar 105 performs a 180° turn with a flip; and 3) turn-bar 110 performs a 90° turn with a flip. The resulting "0° turn with a flip" (the stream of continuous sheets 115 shown in FIG. 8) processing ability is exactly the one stream state change needed for the subject invention.

With a turn-bar assembly 90 positioned between the slitter and cutter/collator units, the subject invention LPEE printing embodiment work is processed faster than traditional two-up work, because the sheets only have to travel the short distance W between cuts, rather than the longer distance L.

Suitable control and verification means are associated with the subject system. Those means implement the subject method by generating printed pages from input data, tracking printed pages through the slitter, turn-bar assembly, cutter, and collator, and verifying the process is functioning properly and that correctly page-sequenced document sets are created. Appropriately designed computer programs control the LPEE printing process, necessary paper transport processes, the slitting device, the cutting equipment, the collation of correctly page-sequenced document sets, and any additional post collation processes. Once familiar with the subject invention, such programming abilities are within the skill of those programmers familiar with high-speed printing techniques, requirements, and equipment.

Finally, it is noted that the subject invention process enjoys a reliability benefit in minimizing accidental web breakage problems because any remit perforations on the pages would run in line with the sheet streams 80 and 85, rather than across them, reducing the likelihood of a stream break on the remit perforations.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A system for printing and assembling correctly page-sequenced documents sets that are formatted and printed in a lazy-portrait narrow-end to narrow-end (LPEE) formatting on a continuous web of printable material, wherein the continuous web has a central axis in a direction of motion of the continuous web during printing and wherein each said documents set is comprised of one or more material sheets with each material sheet having a first side page and a second side page with each material sheet having a top narrow-edge, a distal bottom narrow-edge, and two side long-edges and printed merged document information for each printed page having a head region and a bottom region, wherein said printed merged document information head region is printed proximate one of said material sheet narrow-edges to produce paired first and second material sheets and said paired material sheets have a common axis that is perpendicular to the central axis of the continuous web, wherein when said document set is comprised of more than one printed page, even number printed pages are printed on one of said first and said second sides of said material sheet and odd number printed pages are printed on an opposite side of said first and said second sides of said material sheet, comprising:

a) a printer, wherein said printer includes a print head that prints a portion of both of said paired first and second material sheets;

b) a slitter for separating the LPEE formatted documents pages into a first stream continuous sheets containing said first material sheets and a second stream of continuous sheets containing said second material sheets;

c) means for flipping said first stream of continuous sheets thereby aligning a printed page sequence for more than one page document sets of said first stream with a printed page sequence for more than one page documents sets of said second stream that leads to the assemble of correctly page-sequenced documents sets;

d) a cutter that produces separates material sheets from both said flipped first and said second streams of continuous sheets; and e) a computer controller having programming for directing printing and tracking of said LPEE formatted document pages and verifying the formation of correctly page-sequenced document sets.

2. A system for printing and assembling correctly page-sequenced document sets from LPEE formatted document pages according to claim 1, wherein said flipping means comprises a turn-bar assembly configured to produce a 0° degree turn with a flip of said first stream of sheets.

3. A system for printing and assembling correctly page-sequenced document sets from LPEE formatted document pages according to claim 1, further comprising a collator for collating said separate sheets in more than one material sheet documents into the correctly page-sequenced document sets.

4. A system for printing and assembling correctly page-sequenced document sets that are formatted and printed in a lazy-portrait narrow-end to narrow-end (LPEE) formatting on a continuous web of printable material, wherein the continuous web has a central axis in a direction of motion of the continuous web during printing and wherein each said document set is comprised of one or more material sheets with each material sheet having a first side page and a second side page with each material sheet having a top narrow-edge, a distal bottom narrow-edge, and two side long-edges and printed merged document information for each printed page having a head region and a bottom region, wherein said printed merged document information head region is printed proximate one of said material sheet narrow-edges to produce paired first and second material sheets and said paired material pages have a common axis that is perpendicular to the central axis of the continuous web, wherein when said document set is comprised of more than one printed page, even number printed pages are printed on one of said first and said second sides of said material sheet and odd number printed pages are printed on an opposite side of said first and second sides of said material sheet, comprising:

a) a printer, wherein said printer includes a printer head that prints a portion of both of said paired first and second material sheets;

b) a slitter for separating the LPEE formatted document pages into a first stream of continuous sheets containing said first material sheets and a second stream of continuous sheets containing said second material sheets;

c) a turn-bar assembly positioned to flip said first stream of continuous sheets thereby aligning a printed page sequence for more than one page documents sets of said first stream with a page orientation of said second stream that leads to the assemble of correctly page-sequenced documents sets;

d) a cutter that produces separates material sheets from both said flipped first and said second streams of continuous sheets; and e) a computer controller having programming for directing printing and tracking of said LPEE formatted documents pages and verifying the formation of correctly page-sequenced documents sets.

5. A system for printing and assembling correctly page-sequenced document sets from LPEE formatted document pages according to claim 4, further comprising a collator for collating said separate sheets in more than one material sheet documents into the correctly page-sequenced document sets.

6. A system for printing and assembling correctly page-sequenced document sets that are formatted in a lazy-portrait narrow-end to narrow-end (LPEE) formatting on a continuous web of printable material, wherein the continuous web has a central axis in a direction of motion of the continuous web during printing and wherein each said documents set is comprised of one or more material sheets with each material sheet having a first side page and a second side page with each material sheet having a top narrow-edge, a distal bottom narrow-edge, and two side long-edges and printed merged document information for each printed page having a head region and a bottom region, wherein said printed merged documents information head region is printed proximate one of said material sheet narrow-edges to produce paired first and second material sheets and said paired material sheets have a common axis that is perpendicular to the central axis of the continuous web, wherein when said document set is comprised of more than one printed page, even number printed pages are printed on one of said first and said second sides of said material sheet and odd number printed pages are printed on an opposite side of first and said second sides of said material sheet, comprising:

a) a slitter for separating the LPEE formatted document pages into first stream of continuous sheets containing said first material sheets and a second stream of continuous sheets containing said second material sheets;
b) a turn-bar assembly positioned to flip said first stream of continuous sheets thereby aligning a printed page sequence for more than one page documents sets of said first stream with a page orientation of said second stream that leads to the assemble of correctly page-sequenced documents sets;
c) a cutter that produces separates sheets from both said flipped first and said second streams of continuous sheets;
d) a collator for collating said separate material sheets into the correctly page-sequenced document sets; and
e) control means having programming for printing and tracking said LPEE formatted document pages and overseeing the assembly of the correctly page-sequenced document sets; and
f) color printing means for simultaneous printing in color on a limited region of both said first material sheet and said second material sheet proximate where said first material sheet and said second material sheet are paired at their said narrow-end.

7. A method for printing and assembling correctly page-sequenced document sets produced on a continuous web of material by a printer formatting the document sets in a lazy-portrait narrow-end to narrow-end (LPEE) format formatting, wherein the continuous web has a central axis in a direction of motion of the continuous web during printing and wherein each said document set is comprised of one or more material sheets with each material sheet having a first side page and a second side page with each material sheet having a top narrow-edge, a distal bottom narrow-edge, and two side long-edges and printed merged document information for each printed page having a head region and a bottom region, wherein said printed merged document information head region is printed proximate one of said material sheet narrow-edges to produce paired first and second material sheets and said paired material sheets have a common axis that is perpendicular to the central axis of the continuous web, wherein when said document set is comprised of more than one printed page, even number printed pages are printed on one of said first and said second sides of said material sheet and odd number printed pages are printed on an opposite side of said first and said second sides of said material sheet, comprising the steps:

a) printing by means of a printer a portion of both of said paired first and second material sheets simultaneously;
b) slitting by means of a controller-operated slitter apparatus the LPEE formatted documents pages into a first stream of continuous sheets containing said first material sheets and a second stream of continuous sheets containing said second material sheets;
c) flipping by means of a flipping apparatus said first stream of continuous sheets thereby aligning a printed page sequence for more than one page document sets of said first stream with a page orientation of said second stream that leads to the assemble of correctly page-sequenced documents sets;
d) cutting by means of controller-operated cutting apparatus both said first and said second stream of continuous sheets into separate material sheets; and
e) directing said printing and tracking of said LPEE formatted documents pages and verifying the formation of correctly page-sequenced documents sets by means of a computer and associated programming.

8. A method for printing and assembling correctly page-sequenced document sets from LPEE formatted document pages according to claim 7, wherein said flipping means comprises a turn-bar assembly configured to produce a 0° degree turn with a flip of said firs stream of sheets.

9. A method for printing and assembling correctly page-sequenced document sets from LPEE formatted document pages according to claim 7, further comprising a collator for collating said separate material sheets into the correctly page-sequenced document sets.

10. A method for printing and assembling correctly page-sequenced document sets produced on a continuous web of material by a printer formatting the document sets in a lazy-portrait narrow-end to narrow-end (LPEE) format, wherein the continuous web has a central axis in a direction of motion of the continuous web during printing and wherein each said document set is comprised of one or more material sheets with each material sheet having a first side page and a second side page with each material sheet page having a top narrow-edge, a distal bottom narrow-edge, and two side long-edges and printed merged document information for each printed page having a head region and a bottom region, wherein said printed merged document information head region is printed proximate one of said material sheet narrow-edges to produce paired first and second material sheets and said paired material sheets have a common axis that is perpendicular to the central axis of the continuous web, wherein when said document set is comprised of more than one printed page, even number printed pages are printed on one of said first and said second sides of said material sheet and odd number printed pages are printed on an opposite side of said first and second sides of said material sheet, comprising the step:

a)printing by means of a printer a portion of both of said paired first and second material sheets simultaneously;
b) slitting by means of a controller-operated slitter apparatus the LPEE formatted document pages into a first stream of continuous sheets containing said first material sheets and a second stream of continuous sheets containing said second material sheets;

c) flipping by means of a flipping apparatus said first stream of continuous sheets by means of a turn-bar assembly thereby aligning a printed page sequence for more than one page document sets of said first stream with a page orientation of said second stream that leads to the assemble of correctly page-sequenced documents sets;

d) cutting by means of controller-operated cutting apparatus both said first and said second streams of continuous sheets to produce separate material sheets; and e) directing said printing and tracking of said LPEE formatted document pages and verifying the formation of correctly page-sequenced documents sets by means of a computer and associated programming.

11. A method for printing and assembling correctly page-sequenced document sets from LPEE formatted document pages according to claim 10, further comprising collating said separate material sheets into the correctly page-sequenced document sets.

12. A method for printing and assembling correctly page-sequenced document sets produced on a continuous web of material by a printer formatting the document sets in a lazy-portrait narrow-end to narrow-end (LPEE) format, wherein the continuous web has a central axis in a direction of motion of the continuous web during printing and wherein each said document set is comprised of one or more material sheets with each material sheet having a first side page and a second page with each material sheet having a top narrow-edge, a distal bottom narrow-edge, and two side long-edges and printed merged document information for each printed page having a head region and a bottom region, wherein said printed merged document information head region is printed proximate one of said material sheet narrow-edges to produce paired first and second material sheets and said paired material sheets have a common axis that is perpendicular to the central axis of the continuous web, wherein when said document set is comprised of more than one printed page, even number printed pages are printed on one of said first and said second sides of said material sheet and odd number printed pages are printed on an opposite side of said first and said second sides of said material sheet, comprising the steps:

a) slitting by means of a controller-operated slitter apparatus the LPEE formatted document pages into a first stream of continuous sheets containing said first material sheets and a second streams of continuous sheets containing said second material sheets;

b) flipping by means of a flipping apparatus said first stream of continuous sheets by means of a turn-bar assembly thereby aligning a printed page sequence for more than one page document sets orientation of said first stream with a page orientation of said second stream that leads to the assemble of correctly page-sequenced documents sets;

c) cutting by means of a controller-operated cutting apparatus both said first and said second streams of continuous sheets into separate material sheets;

d) collating by means of a controller-operated collating apparatus said separate sheets into the correctly page-sequenced document sets; and e) tracking said LPEE formatted document pages and overseeing the assembly of the correctly page-sequenced document sets by means of a controller with associated controller programming; and f) printing simultaneously in color on a limited region of both said first material sheet and said second material sheet proximate where said first material sheet and said second material sheet are paired at their said narrow-ends.

* * * * *